United States Patent [19]

Baudot

[11] 4,291,937

[45] Sep. 29, 1981

[54] OPTICAL PANORAMIC SURVEY

[75] Inventor: Jean-Jacques Baudot, Ville d'Avray, France

[73] Assignee: Societe Anonyme de Telecommunications, Paris, France

[21] Appl. No.: 34,020

[22] Filed: Apr. 27, 1979

[30] Foreign Application Priority Data

May 3, 1978 [FR] France .................................. 78 13166

[51] Int. Cl.³ .................................................. G02B 23/02
[52] U.S. Cl. ........................................ 350/23; 350/26
[58] Field of Search ................... 350/21, 22, 23, 24, 350/25, 26, 85

[56] References Cited

U.S. PATENT DOCUMENTS

| | | | |
|---|---|---|---|
| 3,035,477 | 5/1962 | Bosch et al. | 350/85 X |
| 3,558,212 | 1/1971 | Ritchie | 350/23 X |
| 3,610,825 | 10/1971 | Fritzel | 350/23 X |

Primary Examiner—John K. Corbin
Assistant Examiner—Matthew W. Koren

Attorney, Agent, or Firm—Holman & Stern

[57] ABSTRACT

An optical device of the periscope type carried on a vehicle, comprising a sighting tube rotatably mounted in the vehicle, a driving member fixed to the vehicle for rotating the tube about its optical axis, and a reflector placed at the other end of the tube and rotatable about an axis orthogonal to the optical axis, further comprising a central unit for forming electrical voltages representative of the pitch angle and the roll angle of the vehicle, a first resolver the rotor of which is driven in synchronism with the sighting tube and the primary windings of which are connected to said central unit, a second resolver supplying a voltage representative of a pre-determined site angle, a third resolver the primary windings of which are respectively connected to one of the secondary windings of the first resolver and to said central unit, a feed-back loop for servoing the output voltage of said third resolver to the output voltage of said second resolver, and means for transmitting the displacement of the rotor of the third resolver to the axis of said reflector with a 2:1 ratio.

2 Claims, 4 Drawing Figures

OPTICAL PANORAMIC SURVEY

The present invention relates to improvements in optical panoramic survey devices carried by a vehicle.

The panoramic survey devices of the periscope type comprise in known manner a sighting tube rotatably mounted in the vehicle, a driving member fixed to the vehicle to turn the tube about its optical axis, and a reflector placed at the upper end of the tube and tiltable about an axis orthogonal to the optical axis.

In such survey devices, the optical axis of the sighting tube is adjusted to be vertical and the sighting direction is determined as regards the site by the angular position of the tiltable reflector. It is clear that for a given position of the reflector, the sighting direction site can be maintained constant during the panoramic scanning only if the optical axis of the tube, which is also the rotation axis of the panoramic motion, is perfectly vertical.

Due to the fact that the optical device is carried by a vehicle, it is difficult in practice to maintain the optical axis of the tube aligned with the vertical. For so doing, one could connect the optical device to the vehicle through gyro-stabilized gimbals, but such a solution could not be contemplated in practice due to the complexity and bulkiness of the necessary equipment.

The object of the invention is therefore to provide a panoramic survey device wherein the site of the sighting direction is stabilized by relatively simple means.

The concept of the invention resides in constructing by electromechanical means the expression of the sighting direction site as a function of the angular position of the reflector, of the instantaneous relative bearing angle of the sighting direction and of the vehicle position, and to cause this expression to be equal to the desired value of the site angle. As a result, the angular position of the reflector assumes constantly the value which provides a site angle equal to the desired value.

The invention will become more apparent from the following description when taken in conjunction with the accompanying drawings wherein.

Figure 1:
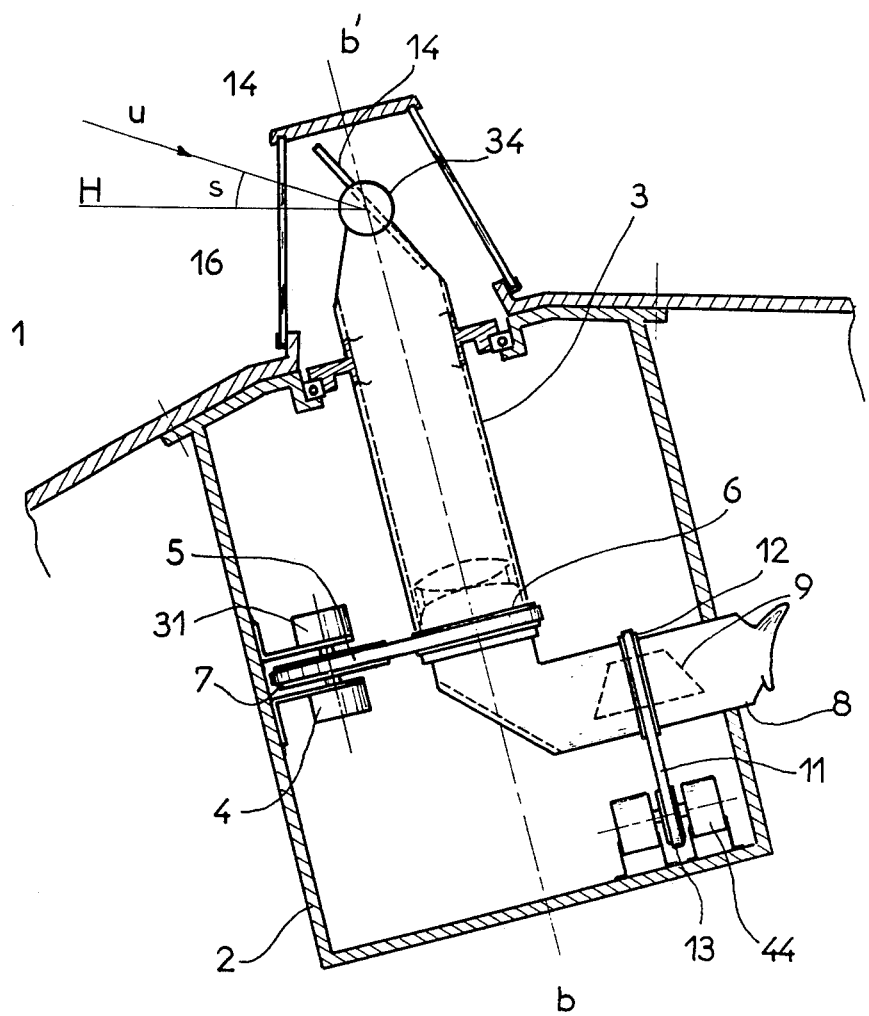
FIG. 1 is an elevation and partial cross-sectional view of a device of the periscope-type.

FIG. 1 shows the frame 1 of a vehicle to which is fixed a casing 2. In this casing is rotatably mounted, via a roller bearing, the sighting tube 3 of a periscope-type optical device. The sighting tube is driven in rotation about its optical axis bb' by a motor 4 fixed to the casing 2, through a toothed belt 5 and wheels 6, 7 or similar means, the transmission ratio being equal to unity.

Moreover, the optical device comprises a fixed eyepiece which is connected to the sighting tube 3. A Wollaston prism 9 or similar member is mounted in the eyepiece and rotatably driven by motor 44 through a toothed belt 11 and wheels 12, 13 providing a transmission ratio of 2:1.

At the upper end of tube 3, a reflector 14 is movable about an axis perpendicular to the optical axis bb'. The angular position of reflector 14 determines the site S of the periscope sighting direction, the site S being the elevation angle formed by the sighting direction and the horizontal plane H of a terrestrial reference system. Such angular position is controlled by a small motor 34 in a manner which will be described in more detail hereafter, a speed-reducer of ratio 2:1 (not shown in FIG. 1) being provided between the shaft of motor 34 and the reflector axis.

Moreover, a protection-guard 16 provided with a side surface made of a transparent material is fixed to the vehicle about reflector.

Figure 2:
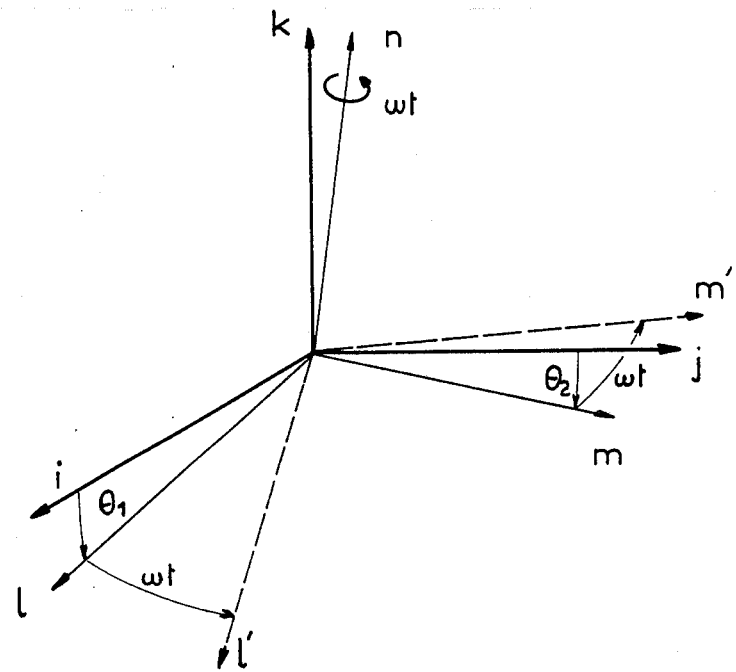
FIG. 2 shows the position of the vehicle relative to the pitch, roll and yaw axes.

In FIG. 2 has been shown the terrestrial reference trihedron composed of vectors $\vec{i}, \vec{j}, \vec{k}$, vector $\vec{k}$ defining the vertical.

The trirectangular trihedron formed by the pitch, roll and yaw axes which is connected to the vehicle is composed of vectors $\vec{l}, \vec{m}, \vec{n}$. Vector $\vec{l}$ is directed along the longitudinal axis of the vehicle, in the direction of its normal forward movement, that is the rolling axis. Vector $\vec{n}$ is coincident with the optical axis bb' of the sighting tube, and corresponds therefore to the "vertical" of the vehicle.

Finally, vector $\vec{m}$ which is perpendicular to the former ones, is transverse to the vehicle, that is the pitch axis.

The vehicle position relative to the axis of the terrestrial reference system may be defined by angle $\theta_1$ (pitch) formed by vectors $\vec{i}$ and $\vec{l}$, and angle $\theta_2$ (roll) formed by vectors $\vec{j}$ and $\vec{m}$.

This position may also be defined by angle $\Theta$, the inclination of vector $\vec{n}$, that is the optical axis bb' of tube 3, relative to the vertical $\vec{k}$ in plane $(\vec{k}, \vec{n})$, and $\alpha$, dihedral angle of the plane $(\vec{k}, \vec{n})$ relative to plane $(\vec{k}, \vec{l})$, the relations between couple $(\theta_1, \theta_2)$ and couple $(\Theta, \alpha)$ being conventionally the following:

$$\cos \Theta = \cos \theta_1 \cdot \cos \theta_2; \quad t_g \alpha = t_g \theta_2 / \sin \theta_1$$

Figure 3:
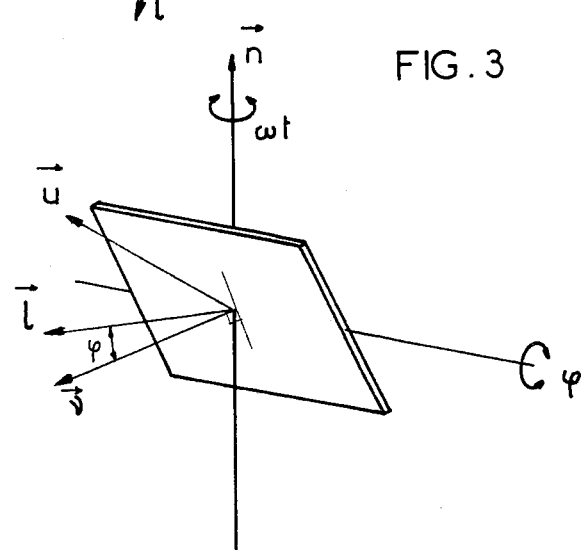
FIG. 3 illustrates the geometrical position of the reflector.

The sighting tube 3 performs a rotation motion $\omega t$ about its optical axis bb'. The reflector 14 is subjected to the panoramic motion and is further movable about its axis. Its position relative to the vehicle is defined, reference being made to FIG. 3, by angle $\phi$ formed by the normal $\vec{v}$ to the plane $(\vec{l}, \vec{m})$ and the angle $\omega t$.

On the other hand, there has been called S (see FIG. 1) the site angle of the sighting direction, that is the angle formed by vector $\vec{u}$ and the horizontal plane H defined by vectors $(\vec{i}, \vec{j})$.

The relative bearing angle G of the sighting direction is the dihedral angle of plane $(\vec{u}, \vec{k})$ with plane $(\vec{l}, \vec{k})$ corresponding to the course of the vehicle.

The value of site S as a function of the position of the reflector and the position data of the vehicle is such that $$\sin S = \sin 2\phi(\cos \omega t \cdot \sin \theta_1 + \sin \omega t \cdot \sin \theta_2 \cdot \cos \theta_1) + \cos 2\phi(\cos \theta_1 \cdot \cos \theta_2) \quad (1)$$

or, in a more condensed manner:

$$\sin S = \sin 2\phi(\sin \Theta \cdot \cos (\omega t + \psi)) + \cos 2\phi \cdot \cos \Theta \text{ by putting down } tg\Phi = \sin \theta_2 / tg\theta_1$$

The site angle S is the value which is to be kept constant and equal to a pre-determined value $S_o$ throughout the panoramic scanning motion imparted to the reflector.

To this end one "constructs" the second member of the hereabove equation (1) by means of resolvers, from the roll-pitch angles $\theta_1$ and $\theta_2$ supplied in the form of trigonometrical lines by a central unit or "verticality platform" existing on the vehicle, and the value of this second member is servoed to a predetermined value, equal to the sine of the desired site angle $S_o$, by adjusting the position of the reflector defined by angle $\phi$.

Figure 4:
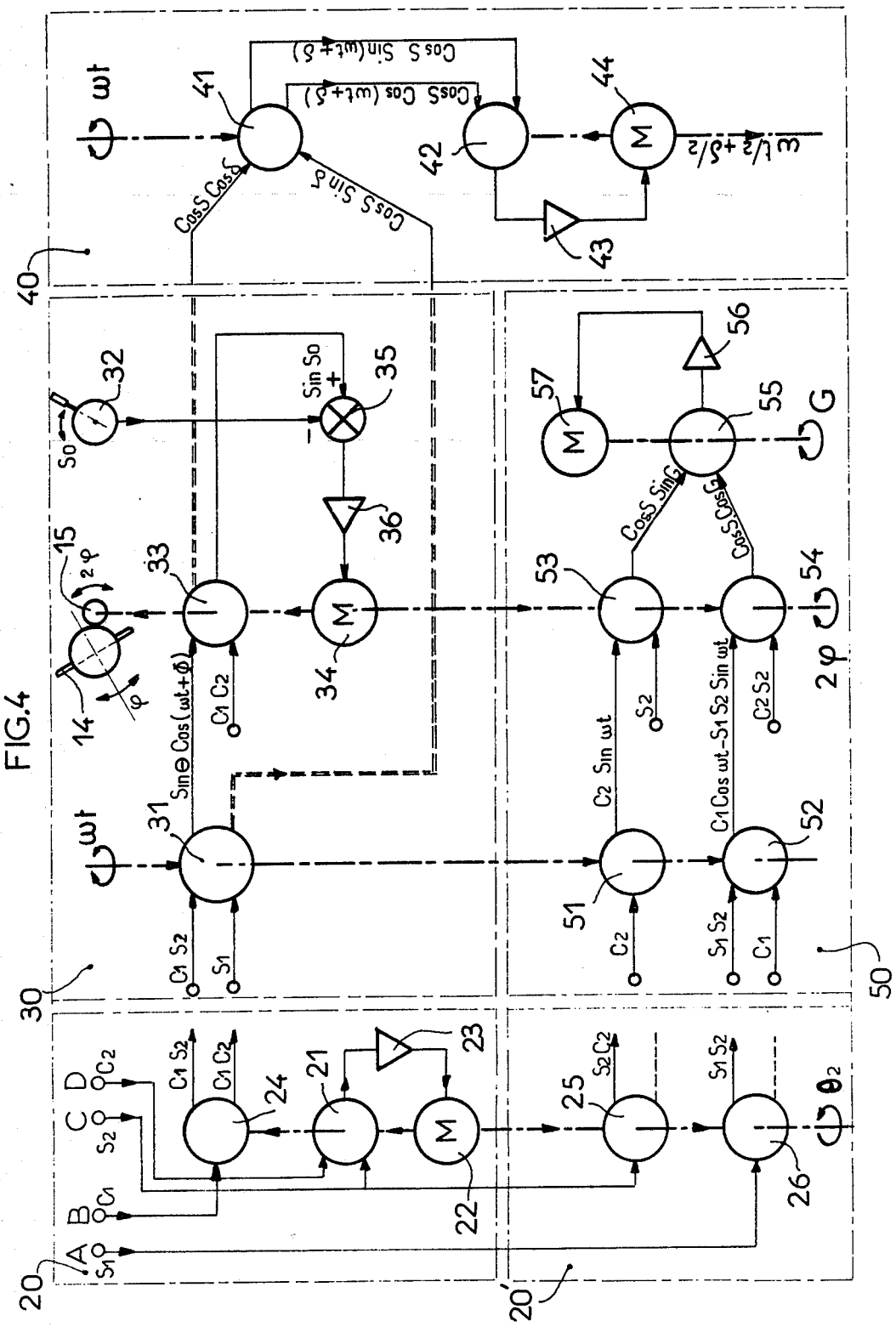
FIG. 4 shows in block-diagram form the electromechanical means provided by the invention for equipping the optical device of FIG. 1.

A preferred embodiment is shown in FIG. 4 where the unit 20 is integrated to the verticality platform and the site stabilization device as such is formed by unit 30.

The verticality platform is a well known device which it is not necessary to describe here. It has been symbolized here by inputs A, B, C, D of unit 20.

The unit 20 receives on its inputs A, B, C, D electrical voltages supplied by the verticality platform and proportional to the trigonometrical functions of $\theta_1$ and $\theta_2$, viz. respectively $\sin\theta_1$, $\cos\theta_1$ and $\sin\theta_2$, $\cos\theta_2$, designated in short in FIG. 4 by $S_1$, $C_1$ and $S_2$, $C_2$.

The unit 20 comprises a servo-control unit composed of a resolver 21, a motor 22 and an amplifier 23, and a resolver 24 the rotor of which recopies the position of the rotor of resolver 21.

Resolver 21 receives on its primary windings $\cos\theta_2$ and $\sin\theta_2$ and its rotor assumes in consequence position $\theta_2$.

Resolver 24 receives on a primary winding a voltage $\cos\theta_1$, and delivers therefore at its secondary winding voltages $\cos\theta_1\cdot\sin\theta_2$ and $\cos\theta_1\cdot\cos\theta_2$.

These voltages are used in unit 30 in the manner described hereafter.

The unit 30 comprises a resolver 31 for the calculation of the first expression between brackets of equation (1), a resolver 32 manually operated for displaying the desired value $S_o$, a resolver 33 for the calculation of the second member of equation (1), the rotor of which is connected to the axis of reflector 14, and a feedback loop the function of which is to nul the difference between the outputs of resolvers 32 and 33.

Resolver 31 is driven in synchronism with the sighting tube and its rotor assumes therefore an angular position $\omega t$. It receives from unit 20 the voltages $\sin\theta_1$ and $\sin\theta_2\cdot\cos\theta_1$, and supplies therefore on one of its secondary windings a voltage proportional to:

$$\cos\omega t\cdot\sin\theta_1 + \sin\omega t\cdot\sin\theta_2\cdot\cos\theta_1.$$

Resolver 33 receives this latter voltage on one of its primary windings and value $\cos\theta_1\cdot\cos\theta_2$ on the other from resolver 24. Its rotor is connected to the reflector axis through a speed-reducer 15 of ratio 2:1, and, therefore, its angular position can be defined as being equal to $2\phi$. This angular position is controlled by motor 34 of the servo-control loop which comprises also a subtracter 35 and an amplifier 36.

The subtracter 35 receives on its input connected to resolver 33 a voltage:

$$\sin 2\phi[\cos\omega t\cdot\sin\theta_1 + \sin\omega t\cdot\sin\theta_2\cdot\cos\theta_1] + \cos 2\phi[\cos\theta_1\cdot\cos\theta_2]$$

and on its other input connected to resolver 32 a voltage $\sin S_o$.

The output voltage of the subtracter, equal to the difference of said voltages, is amplified and then applied to motor 34 which drives the rotor of resolver 33 in the direction of annuling said difference. The angle $2\phi$ assumes then constantly the value confirming the hereabove equation (1), and position $\phi$ of the reflector is thus determined so that at each moment, the sighting direction site is equal to $S_o$.

The unit 40 of FIG. 4 is used for the correction of the image cant.

The image cant is the field rotation which appears in a periscopic device due to the fact that the (mobile) sighting direction and the (fixed) direction of the observer's look are not coinciding. If one supposes that $\theta_1=0$ and $\theta_2=0$, the image cant is equal to $\omega t$ and for correcting this cant, one uses conventionally a Wollaston prism or similar member which is rotated about the optical axis of the device by an angle $\omega t/2$.

If however $\theta_1$ and $\theta_2$ are not zero, the image cant is no longer strictly equal to $\omega t$ and a corrective $\delta$ has to be added and the prism has to be given a position $\omega t/2 + \delta/2$.

Calculation shows that angle $\delta$ confirms equations $$\cos S\cdot\cos\delta = -\cos 2\phi[\sin\cdot\cos(\omega t + \Phi)] + \sin 2\phi\cdot\cos\Theta \quad (2)$$

$$\cos S\cdot\sin\delta = \sin\Theta\cdot\sin(\omega t + \Phi) \quad (3)$$

The second member of equation (2) is available on the secondary winding of resolver 33 which is not used for site stabilization, and, equally, the second member of equation (3) is available on the secondary winding of resolver 31 which is not used so far.

These two voltages are applied to the primary windings of a resolver 41 the rotor of which is driven in synchronism with the sighting tube 3. Thus, the following voltages are obtained at the outputs of resolver 41:

$$\cos S\cdot\cos(\omega t + \delta) \text{ and } \cos S\cdot\sin(\omega t + \delta)$$

These voltages are applied to a servo-control unit comprising a resolver 42, an amplifier 43 and a motor 44 realizing mechanically the angle $(\omega t + \delta)$.

The motor 44 drives through a reducing mechanism of ratio 2:1 the Wollaston prism 9 (see FIG. 1) the angular position of which is therefore $\omega t/2 + \delta/2$.

The data available at the outputs of units 20 and 30 make it also possible to determine the relative bearing G of the sighting direction.

To this end, the following equations are considered:

$$\cos S\cdot\sin G = -\sin 2\phi\cdot\cos\theta_2 \sin\omega t + \cos 2\phi\cdot\sin\theta_2 \quad (4)$$

$$\cos S\cdot\cos G = -\sin 2\phi[\cos\omega t\cdot\cos\theta_1 - \sin\omega t\cdot\sin\theta_2\cdot\sin\theta_1] + \cos 2\phi[\cos\theta_2\cdot\sin\theta_1]$$

The second members of equations (4) and (5) may be "constructed" in a similar manner as has been described hereabove for unit 40, by means of resolvers, then the obtained voltages are applied to a servo-control unit.

The calculation chain of the relative bearing comprises a unit 20' completing unit 20 and comprising two resolvers 25 and 26 fixedly connected to motor 22 and receiving respectively $\sin\theta_1$ and $\sin\theta_2$. They deliver therefore the voltages $\sin\theta_1\cdot\cos\theta_2$ and $\sin\theta_1\cdot\sin\theta_2$.

The calculation unit 50 as such comprises resolvers 51', 52 driven in synchronism with the sighting tube.

Resolver 51 receives the voltage $\cos\theta_2$ and delivers therefore $\cos\theta_2\cdot\sin\omega t$.

Resolver 52 receives at its inputs $\cos\theta_1$ and $\sin\theta_1\cdot\sin\theta_2$ and delivers:

$$\cos\omega t\cdot\phi_1 - \sin\omega t\cdot\sin\theta_2\cdot\sin\theta_1.$$

Two other resolvers 53, 54 have their rotors connected to motor 34 and assume therefore a position $2\phi$.

Resolver 53 receives on its inputs voltage cos $\theta_2 \cdot \sin \omega t$ from resolver 51 and on the other input sin $\theta_2$. Thus, it delivers (see equation (5)) a voltage cos S. cos G.

Resolver 54 receives on its inputs the voltage from resolver 52 and on the other input the voltage cos $\theta_2 \cdot \sin \theta_2$. It delivers therefore the voltage cos S. sin G (see equation (4)).

The output voltages of resolvers 53 and 54 are applied to the primary windings of a resolver 54 forming with amplifier 56 and motor 57 a servo-control unit. The result is that the rotor of resolver 55 assumes an angular position G allowing the display—or an exploitation of any other type—of the relative bearing angle of the sighting direction.

It will be noted that, for the sake of clarity, some of the resolvers shown in FIG. 4 have not been shown in FIG. 1.

What I claim is:

1. An optical device of the periscope type carried on a vehicle, comprising:
    a sighting tube, having an optical axis, rotatably mounted in and having one end projecting from the vehicle;
    a driving member fixed to the vehicle for rotating the tube about said optical axis;
    a reflector placed at said one end of the tube and rotatable about a reflector axis disposed orthogonally with respect to said optical axis;
    a central unit for providing electrical voltages representative, respectively, of the pitch angle and roll angle of the vehicle;
    a first resolver having an input winding, a rotor and first and second primary windings connected to receive said voltages, respectively, from said central unit;
    means for driving said rotor of said first resolver in synchronism with said sighting tube;
    a second resolver for supplying an output voltage representative of a predetermined site angle;
    a third resolver having a rotor and first and second primary windings which are respectively connected to the secondary winding of said first resolver and to said central unit to receive one of said voltages, said third resolver providing an output voltage;
    a feedback loop for nulling the difference between the output voltage of said third resolver and the output voltage of said second resolver; and
    means for transmitting the displacement of the rotor of the third resolver to the axis of said reflector with a 2:1 ratio.

2. The device according to claim 1 wherein said first and third resolvers each have respective second secondary windings, said device further comprising:
    a fixed eyepiece connected to said sighting tube;
    a prism rotatably mounted in said eyepiece for the correction of the image cant;
    a fourth resolver having a rotor and first and second primary windings respectively connected to the second secondary winding of said first resolver and said second secondary winding of said third resolver, said fourth resolver including two secondary windings;
    means for driving the fourth resolver rotor in synchronism with said sighting tube;
    a servo-control unit comprising a motor and a fifth resolver, the fifth resolver having a rotor which is coupled to said motor and two primary windings which are connected, respectively, to the two secondary windings of the fourth resolver, said fifth resolver including a secondary winding which is connected to said motor; and
    means for transmitting the displacement of the shaft of the motor to the rotatable prism with a 2:1 ratio.

* * * * *